March 2, 1971     N. W. GITS     3,567,230

SHAFT SEAL

Filed Sept. 25, 1969

INVENTOR
Norbert W. Gits
By Leonard O. Knox
Atty

United States Patent Office 3,567,230
Patented Mar. 2, 1971

3,567,230
SHAFT SEAL
Norbert W. Gits, 6417 Blackhawk Trail,
Indian Head Park, Ill. 60525
Filed Sept. 25, 1969, Ser. No. 861,006
Int. Cl. F16j 15/36
U.S. Cl. 277—89
8 Claims

ABSTRACT OF THE DISCLOSURE

A rotatable seal for sealing a shaft with respect to an enclosure from which the shaft extends to preclude leakage from or into the enclosure along the shaft and rubbing surfaces are provided on the rotating seal and the enclosure respectively. In particular, an improved packing is provided to achieve fluid tightness of the seal with respect to the shaft, together with means to adjustably compress the packing into such tight relation by simple, effective means.

BACKGROUND OF THE INVENTION

Since, in a rotatable seal of the general class mentioned in the abstract, it is essential to provide a tight fit between the seal and shaft it has been the practice to employ a packing. However, those packings utilized heretofore were of materials which were subject to degradation in the presence of certain gases or fluids, deteriorated by aging as in the case of rubber, or were subject to damage and misfunction when installed on a marred shaft. Further, prior constructions did not provide for adequate tightness of the packing relative to the shaft or to adjacent parts so that the packing was subject to leakage and to deformation upon movement of the parts.

The present invention incorporates improvements in such sealing assemblies to avoid the shortcomings mentioned.

SUMMARY OF THE INVENTION

Broadly regarded, the invention comprises a rotatable unitary assembly including a seal ring provided with a radial flat face to bear, with rubbing contact, on an opposed radial flat face of a fixed member assembled with or forming part of the enclosure from which the shaft extends. A first collar at the end of the assembly remote from the seal ring includes a clamping portion having an interior frusto-conical surface abutting a corresponding frusto-conical face at one end of the packing whereby the packing is compressed to seal the shaft against leakage therealong from or into the enclosure. The opposite end of the packing is secured to the seal ring by a ferrule. The assembly includes a second collar having threaded engagement with the first collar whereby the latter may be adjusted to compress the packing with a wedging action to achieve the desired degree of tightness of the packing. The adjusted relation of the collars and packing is preserved by means of set screws. That end of the second collar opposite its threaded end has an inner flange retained behind a peripheral projection on the packing. The assembly includes the customary splined connection to enable joint rotation of the parts of the assembly while permitting floating of the seal ring.

THE DRAWING

DESCRIPTION OF THE PREFERRED EMBODIMENT

Figure 1:
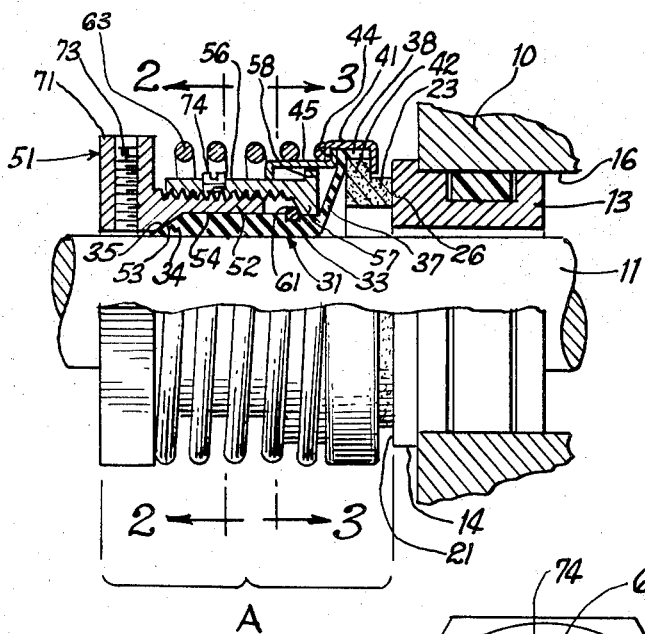
FIG. 1 is a combined longitudinal cross section and side elevation of the seal assembly in its relation to the fixed rubbing surface, shaft and machine enclosure.
Figure 2:
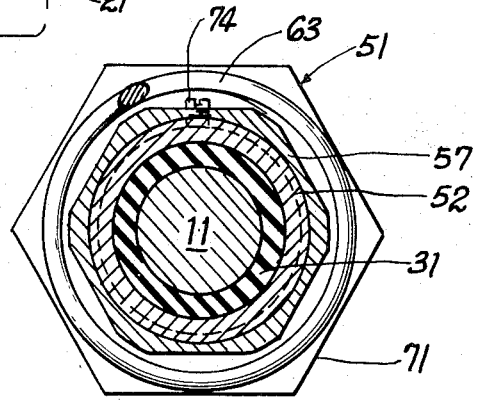
FIG. 2 is a cross section taken on the line 2—2 of FIG. 1.

Turning to FIG. 1, a machine, e.g., a pump, has a housing 10 within which the rotating part, the impeller, is enclosed, the pump shaft being indicated at 11. A bushing 13 having a flange 14 is received in a bore 16 of the housing 10. The left-hand face 21 of the bushing 13 is ground or otherwise finished to present a smooth rubbing face which is in a plane normal to the shaft axis.

The seal assembly A of the invention includes the conventional seal ring 23, usually comprising graphite together with a suitable binder, this ring having a face 26 rubbing on the face 21.

A cylindrical packing member 31 surrounds the shaft 11 and has a surface 33 providing for a reasonably snug fit on the shaft, viz, such as will permit the seal to be disassembled from the shaft following relaxation of the compression fit to be described. Teflon is preferred for the member 31 because of its superior resistance to attack by chemicals and the effects of high temperature— qualities not possessed by the rubber and similar packings heretofore employed. However Teflon is relatively inelastic and is subject to cold flow. The present invention takes advantage of the beneficial characteristics of Teflon while minimizing or utilizing its less desirable qualities.

At its left end the packing member 31 has a frusto-conical portion 34, the face 35 of which is at a shallow angle to the shaft axis, e.g., on the order of 15° to 30°. The opposite end of the member 31 has a web 37 continuing into a flange 38 received over the seal ring 23, and to which the flange is secured by means of a ferrule 41 swaged over the flange 42 of the seal ring and a flange 44 of a shell 45 to be described. The web 37 allows for axial movement of the parts without disturbing the adjusted, fixed position of the packing 31.

A first collar 51 of metal or other rigid material has an extension 52 provided with a frusto-conical face 53 sloped to correspond with the face 35 in order that, when the collar 51 is adjustably moved to the right, the extension 52 will compress the portion 34 into tight engagement with the shaft 11. The compressive force is such that a completely reliable seal is achieved, notwithstanding marring or other minor irregularities of the shaft which may be present. The extension 52 has a cylindrical inner surface 54 contiguous to the cylindrical portion of the packing to preclude buckling of the packing when it is compressed. Adjustment of the collar 51 will be described hereinafter.

A second collar 56 is threadedly engaged over the extension 52 and is provided with inner and outer flanges 57 and 58. The flange 57 is a reasonably snug, but not tight fit over the packing 31. Flange 57 is restrained against movement to the left by means of a split ring 61 fitted into a groove in the packing member 31 or an equivalent peripheral projection. However, the use of a split ring permits the collar 56 to be assembled over the packing member 31 and thereafter retained.

A compression spring 63 is interposed between the collar 51 and shell 41 whereby the seal ring 23 is biased into rubbing contact with the face 21 of the bushing 13.

Figure 3:
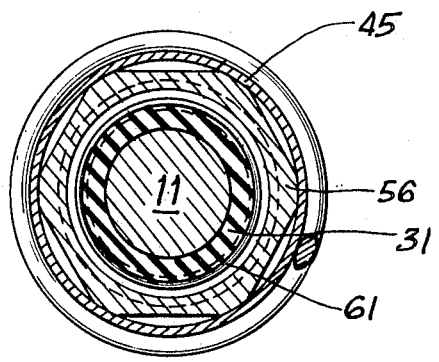
FIG. 3 is a cross section taken on the line 3—3 of FIG. 1.

In order to permit the seal ring 23 to float axially a spline connection is provided between the shell 45 and collar 56. The splines may be of any suitable construction, e.g., a hexagonal male formation of the collar 56 and a congruent female aperture in the shell 45 (FIG. 3).

The shell 45 functions as an inner guide for the spring 63 and as an outer guide for the collar 56.

Assembly is as follows: shell 45, collar 56, packing 31 including its split ring 61, and seal ring 23 are positioned in mutual relation and the ferrule 41 is swaged into tight relation with the several parts embraced thereby. The spring 63 is then located over the ferrule 45 and the extension 52 is screwed into the collar 56. The unitary assembly A is now ready for installation, it being understood that, at this stage, the surfaces 35 and 53 are not in clamped relation. The assembly is slipped onto the shaft 11 to bring the rubbing surfaces 21 and 26 into contact. Now the collar 51 which is provided with an hexagonal periphery 71 to receive a wrench, is rotated relatively to the packing 31 to clamp the packing into tight abutment with the shaft 11, the surfaces 35 and 53 sliding on one another. When the required degree of compression has been obtained set screws 73 and 74 are tightened.

To remove the seal the set screws are loosened and the collar 51 backed off to relieve the pressure on the packing 31, whereafter the entire assembly A may be withdrawn from the shaft 11.

It will be apparent that the feathered edge of the conical part 34 imparts flexibility whereby wobbling movement of the seal is permitted without diminution in the sealing efficiency of the packing.

I claim:

1. A rotatable assembly to provide a seal between the interior of an enclosure from which a shaft extends and the exterior of the enclosure, and which assembly includes a seal ring having rubbing contact with a face of the enclosure structure, comprising: a relatively rigid yet deformable packing of hollow, generally cylindrical configuration surrounding the shaft and having a close fit therewith, one exterior end portion of the packing having a conical form, a first collar having an interior conical surface portion complementary to said packing end portion, both said portions constituting cooperative wedging means, means to secure the other end of said packing to the seal ring, a second collar threadedly engaged with said first collar for axial adjustment therebetween, said second collar and packing having mutually engageable means to restrain said packing against axial movement, said first collar when rotated, moving axially by reason of said threaded engagement relative to said second collar thereby causing said conical surface portion of said first collar to compress the packing into tight, leak-proof engagement with the shaft, means to bias the seal ring into rubbing contact, means to lock said first collar to the shaft, means to lock said collars together following adjustment, and spline means intermediate said seal ring and second collar to allow limited axial movement of the seal ring, while transmitting driving force from the shaft through the packing to the seal ring.

2. The combination in accordance with claim 1 in which the packing has a radially-extending web at the other end thereof and a ferrule is provided to secure said web to the seal ring.

3. The combination in accordance with claim 1 in which the packing comprises Teflon.

4. The combination in accordance with claim 1 in which said packing has a cylindrical portion extending away from the conical end portion and the first collar has a complementary cylindrical portion having a snug fit with said packing cylindrical portion to preclude buckling of the packing when the conical faces are forced into wedging relation.

5. The combination in accordance with claim 1 in which said mutually engageable means comprises an inwardly-extending flange on the second collar and an outwardly-extending projection on the packing.

6. The combination in accordance with claim 1 in which the first collar has an outwardly extending flange, one member of the spline means comprising a shell secured to the seal ring, said shell having a radially-outwardly-extending flange and the bias means is a compression spring intermediate said flange.

7. The combination in accordance with claim 1 in which the packing has a radially-extending web at the other end thereof, a shell is provided to constitute one member of the spline means, said shell having an outwardly-extending flange contiguous to the web and a ferrule is provided to constitute one member of the spline means, said shell having an outwardly-extending flange contiguous to the web and a ferrule is provided to clamp said shell flange and web to the seal ring.

8. The combination in accordance with claim 1 in which the second collar, at its inner end, is spaced away from the seal ring, the means securing the other end of the packing to the seal ring comprises an outwardly-extending web and a ferrule clamping the web to the seal ring, the space between the second collar and seal ring allowing the web to flex with movement of the seal ring and/or adjustment of the first collar.

References Cited

UNITED STATES PATENTS 2,881,014  4/1959  Amirault et al. _____ 277—89

FOREIGN PATENTS 593,413  10/1947  Great Britain _____ 277—89

LAVERNE D. GEIGER, Primary Examiner

R. I. SMITH, Assistant Examiner